US008606714B1

(12) United States Patent
Cameo et al.

(10) Patent No.: US 8,606,714 B1
(45) Date of Patent: *Dec. 10, 2013

(54) FLEXIBLE ACCOUNT MANAGEMENT FOR CUSTOMER TRANSACTIONS AND OVERDRAFTS

(75) Inventors: Valerie Felice Cameo, Chicago, IL (US); Mark Dickelman, Inverness, IL (US); Victoria Ann Vogt, Plymouth, MN (US)

(73) Assignee: U.S. Bank National Association, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,209

(22) Filed: Mar. 12, 2012

Related U.S. Application Data

(63) Continuation-in-part of application No. 12/901,138, filed on Oct. 8, 2010, now Pat. No. 8,255,330.

(60) Provisional application No. 61/250,267, filed on Oct. 9, 2009.

(51) Int. Cl.
  *G06Q 40/00*  (2012.01)
(52) U.S. Cl.
  USPC ............... 705/44; 705/35; 705/40; 705/41; 705/42; 705/43; 705/45
(58) Field of Classification Search
  USPC .............................................. 705/35, 40–45
  See application file for complete search history.

(56) References Cited

U.S. PATENT DOCUMENTS

| 5,465,206 | A | 11/1995 | Hilt et al. |
|---|---|---|---|
| 5,596,642 | A | 1/1997 | Davis et al. |
| 5,596,643 | A | 1/1997 | Davis et al. |
| 5,649,117 | A | 7/1997 | Landry |
| 5,649,118 | A | 7/1997 | Carlisle et al. |
| 5,650,604 | A | 7/1997 | Marcous et al. |
| 5,717,989 | A | 2/1998 | Tozzoli et al. |
| 6,070,150 | A | 5/2000 | Remington et al. |
| 6,292,789 | B1 | 9/2001 | Schutzer |
| 6,298,335 | B1 | 10/2001 | Bernstein |
| 6,529,187 | B1 | 3/2003 | Dickelman |
| 7,092,913 | B2 | 8/2006 | Cannon, Jr. |
| 7,174,302 | B2 | 2/2007 | Patricelli et al. |
| 7,280,981 | B2 | 10/2007 | Huang et al. |
| 7,387,238 | B2 | 6/2008 | Foss et al. |
| 7,464,859 | B1 | 12/2008 | Hawkins |
| 7,472,088 | B2 * | 12/2008 | Taylor et al. ................... 705/38 |
| 7,584,151 | B2 | 9/2009 | Wells et al. |
| 7,590,557 | B2 | 9/2009 | Harrison et al. |
| 7,617,156 | B1 * | 11/2009 | Wolfson ......................... 705/42 |

(Continued)

*Primary Examiner* — Narayanswamy Subramanian
(74) *Attorney, Agent, or Firm* — Crawford Maunu PLLC

(57) ABSTRACT

Various aspects relate to systems, methods or devices for processing overdrafts made by customers. A particular embodiment is directed toward a system that is configured to receive transaction data from customer-oriented terminals. The transaction data includes requests for monetary transfers on behalf of customers that hold a checking or savings account at a financial institution. In response to receiving the transaction data, the system accesses customer account information, which can include the amount of funds in the checking or savings accounts. The system determines whether sufficient funds exist in the accounts to cover the financial transactions. In response to a potential overdraft of one or more customer accounts, stored customer information is accessed to determine and authorize overdraft deferment eligibility of the customer based upon the stored customer information. The system defers an overdraft fee by providing a grace period during which funds can be transferred to cover the overdraft.

15 Claims, 5 Drawing Sheets

(56) References Cited

U.S. PATENT DOCUMENTS

| | | | |
|---|---|---|---|
| 7,627,523 B1 | 12/2009 | Symonds et al. | |
| 7,661,586 B2 | 2/2010 | Robbins, Jr. et al. | |
| 7,664,690 B2 | 2/2010 | Dirnberger et al. | |
| 7,664,705 B2 | 2/2010 | Walker et al. | |
| 7,680,679 B1 | 3/2010 | Patricelli et al. | |
| 7,702,530 B2 | 4/2010 | Pearson | |
| 7,702,553 B1 | 4/2010 | Dickelman | |
| 7,702,577 B1 | 4/2010 | Dickelman | |
| 7,711,621 B2 | 5/2010 | Huang et al. | |
| 7,814,019 B2 | 10/2010 | Knapp | |
| 7,958,050 B2* | 6/2011 | Finch | 705/40 |
| 8,074,876 B2 | 12/2011 | Foss et al. | |
| 8,234,215 B2* | 7/2012 | Keiser et al. | 705/41 |
| 8,255,330 B2* | 8/2012 | Cameo et al. | 705/44 |
| 8,271,386 B2* | 9/2012 | Seay et al. | 705/44 |
| 8,364,581 B2* | 1/2013 | Schamer et al. | 705/38 |
| 8,429,079 B1* | 4/2013 | Cameo et al. | 705/44 |
| 2001/0014878 A1 | 8/2001 | Mitra et al. | |
| 2002/0002495 A1 | 1/2002 | Ullman | |
| 2002/0111886 A1 | 8/2002 | Chenevich et al. | |
| 2002/0111915 A1 | 8/2002 | Clemens et al. | |
| 2002/0111916 A1 | 8/2002 | Coronna et al. | |
| 2002/0145051 A1 | 10/2002 | Charrin | |
| 2002/0184147 A1 | 12/2002 | Boulger | |
| 2003/0009382 A1 | 1/2003 | D'Arbeloff et al. | |
| 2003/0061147 A1 | 3/2003 | Fluhr et al. | |
| 2003/0061157 A1 | 3/2003 | Hirka et al. | |
| 2004/0024703 A1 | 2/2004 | Roskind | |
| 2004/0030657 A1 | 2/2004 | Holm-Blagg et al. | |
| 2004/0044621 A1 | 3/2004 | Huang et al. | |
| 2004/0080691 A1 | 4/2004 | Mi et al. | |
| 2004/0093302 A1 | 5/2004 | Baker et al. | |
| 2005/0060579 A1 | 3/2005 | Dickelman et al. | |
| 2005/0077350 A1 | 4/2005 | Courtion et al. | |
| 2005/0222961 A1 | 10/2005 | Staib et al. | |
| 2005/0267840 A1 | 12/2005 | Holm-Blagg et al. | |
| 2006/0059085 A1* | 3/2006 | Tucker | 705/38 |
| 2006/0089906 A1 | 4/2006 | Rowley | |
| 2006/0116957 A1 | 6/2006 | May et al. | |
| 2007/0038577 A1 | 2/2007 | Werner et al. | |
| 2007/0100745 A1* | 5/2007 | Keiser et al. | 705/38 |
| 2007/0106558 A1* | 5/2007 | Mitchell et al. | 705/16 |
| 2007/0282743 A1 | 12/2007 | Lovelett et al. | |
| 2008/0015985 A1* | 1/2008 | Abhari et al. | 705/42 |
| 2008/0046358 A1 | 2/2008 | Holm-Blagg et al. | |
| 2008/0103985 A1 | 5/2008 | Huang et al. | |
| 2008/0275748 A1 | 11/2008 | John | |
| 2008/0306838 A1 | 12/2008 | Fleet et al. | |
| 2008/0307034 A1 | 12/2008 | Fleet et al. | |
| 2009/0030848 A1 | 1/2009 | Wendel | |
| 2009/0037310 A1* | 2/2009 | Claypoole et al. | 705/35 |
| 2010/0138288 A1 | 6/2010 | Walker et al. | |
| 2010/0153247 A1* | 6/2010 | DiPaolo et al. | 705/34 |
| 2011/0125643 A1* | 5/2011 | Cameo et al. | 705/44 |
| 2012/0054093 A1* | 3/2012 | Schamer et al. | 705/39 |
| 2013/0013506 A1* | 1/2013 | Wiggins et al. | 705/44 |
| 2013/0060669 A1* | 3/2013 | Rose et al. | 705/35 |
| 2013/0110712 A1* | 5/2013 | Schamer et al. | 705/40 |

* cited by examiner

FLEXIBLE ACCOUNT MANAGEMENT FOR CUSTOMER TRANSACTIONS AND OVERDRAFTS

RELATED PATENT DOCUMENTS

This is a continuation-in-part, and claims benefit for common subject matter under 35U.S.C. §120, of U.S. patent application Ser. No. 12/901,138 filed on Oct. 8, 2010, now U.S. Pat. No. 8,255,330 and entitled "Overdraft Protection And Forgiveness;" which claims the benefit, under 35 U.S.C. §119(e), of U.S. Provisional Patent Application Ser. No. 61/250,267 filed on Oct. 9, 2009, and entitled "Overdraft Protection and Forgiveness;" each of which are fully incorporated herein by reference as describing and illustrating subject matter (in part(s) or in its entirety) that can be practiced with the subject matter disclosed herein.

FIELD OF THE INVENTION

The present disclosure relates to integrated financial network systems and more particularly pertains to a computer system designed to provide communications and processing for an overdraft protection program.

OVERVIEW

Banks provide various services to their customers. Customers holding account(s) at a bank initiate a number of transfers, withdrawals, deposits and other functions that banks oversee, audit and otherwise facilitate. Many banking systems operate using periodic settlement of outstanding transactions. Transactions are accumulated during the day and then settlement occurs between banks and/or other parties (e.g., vendors or merchants). The value in a customer's account can vary throughout the day. Unlike a credit card account, overdrafts occur on a fund bearing account that, at settlement time, has pending transactions exceeding the funds in the account. After settlement occurs and an account is overdrawn, the disparity between the pending transactions and the account value is often temporarily covered by the account-holding bank while the customer is charged an overdraft fee.

Aspects of the present disclosure are exemplified in a number of illustrated implementations and applications, some of which are shown in the figures and characterized in the claims section that follows.

SUMMARY

The present disclosure is exemplified in a number of embodiments, implementations and applications, some of which are summarized below.

Various aspects relate to systems, methods or devices for processing overdrafts made by customers. A particular embodiment is directed toward a system that is configured to receive transaction data from customer-oriented terminals. The transaction data includes requests for monetary transfers on behalf of customers that hold a checking or savings account at a financial institution. In response to receiving the transaction data, the system accesses customer account information, which can include the amount of funds in the checking or savings accounts. The system determines whether sufficient funds exist in the accounts to cover the financial transactions. In response to a potential overdraft of one or more customer accounts, stored customer information is accessed to determine and authorize overdraft deferment eligibility of the customer based upon the stored customer information. The system defers an overdraft fee by providing a grace period during which funds can be transferred to cover the overdraft.

Embodiments of the present disclosure are directed toward a method of operating a computer system. The computer system receives transaction data from customer-oriented terminals, the transaction data including requests for monetary transfers on behalf of customers having, and the monetary transfers from, a checking or savings accounts held at a financial institution. The computer system accesses a database containing, in response to receiving the transaction data, customer account information that includes the amount of funds in the checking or savings accounts. The computer system determines whether sufficient funds exist in the accounts to cover the financial transactions. In response to a potential overdraft of one or more customer accounts, stored customer information is accessed and based upon the stored customer information, eligibility of the customer for enrollment in an overdraft protection program is determined. The computer system then authorizes the transaction based upon the determination of eligibility. An indication of eligibility is then provided to the customer. The computer system also provides a grace period during which funds can be transferred to cover the overdraft without charging a penalty for the overdraft.

Embodiments of the present disclosure are directed toward a system with at least one computer processor. The computer processor(s) can be configured to receive transaction data from customer-oriented terminals, the transaction data including requests for monetary transfers on behalf of customers having, and the monetary transfers from, a checking or savings accounts held at a financial institution. The computer system can also access, in response to receiving the transaction data, customer account information that includes the amount of funds in the checking or savings accounts. A determination is then made as to whether sufficient funds exist in the accounts to cover the financial transactions. In response to a potential overdraft of one or more customer accounts, the system accesses stored customer information and based upon the stored customer information, determines eligibility of the customer for enrollment in an overdraft protection program. The transaction is authorized based upon the determination of eligibility. The system provides an indication of eligibility to the customer and of a grace period during which funds can be transferred to cover the overdraft without charging a penalty for the overdraft.

The above summary is not intended to describe each illustrated embodiment or every implementation of the present disclosure.

BRIEF DESCRIPTION OF FIGURES

The disclosure may be more completely understood in consideration of the detailed description of various embodiments of the disclosure that follows in connection with the accompanying drawings as follows.

Figure 1:
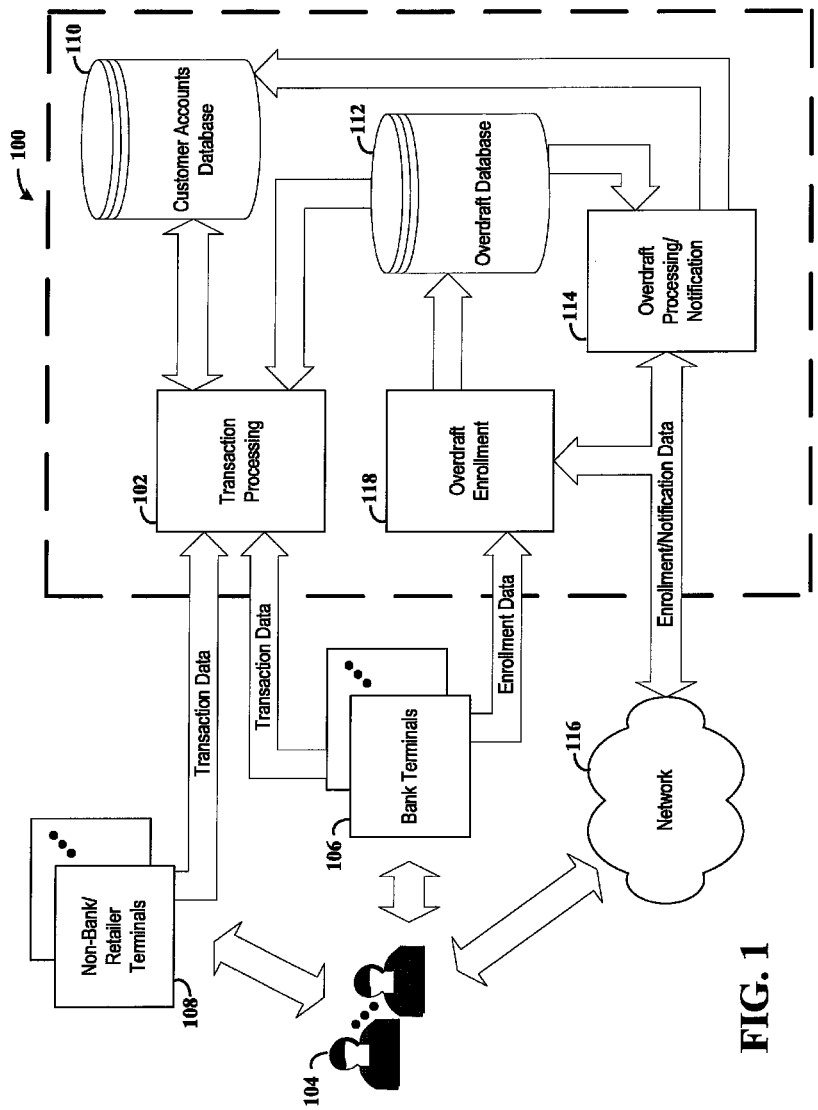
FIG. 1 shows a block diagram of a circuit-based network system, consistent with an embodiment of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The present disclosure is believed to be useful for certain computer-implemented circuits which automatically provide customers of a financial institution with an overdraft protection program. Implementations of the present disclosure have been found to be particularly advantageous for operation by banks for providing customers the opportunity to have overdraft protection for accounts while avoiding overdraft fees. While the present disclosure is not necessarily limited to such applications, various aspects of the disclosure may be appreciated through a discussion of various examples using this context.

As a first example, an embodiment of the present disclosure is directed to a computer-based circuit operable on behalf of a financial institution for overdraft protection on behalf of customers of the financial institution. The computer-based circuit includes a network-interface circuit, a computer arrangement, and a memory circuit for managing and accessing a database relevant to the customer account types and overdraft protection information. The network-interface circuit, such as a broadband communication pathway or local area link, is configured to receive transaction data, from a customer-oriented terminal, indicative of one of the plurality of customers having actively engaged in a financial transaction involving an account that the customer holds at the financial institution. Example types of transactions include (without limitation) ATM withdrawals, online bill pay, ACH transactions, and using a debit/check card.

The computer arrangement, which would be operated on behalf of the bank or other financial institution, includes a software-programmed computer system, configured for each of the plurality of customers, to perform the following operations: the computer arrangement first accesses the customer's account information in the customer accounts database and determines whether the customer's account contains sufficient funds to cover the amount of the actively engaged transaction. The computer arrangement approves the transaction if the account contains sufficient funds to cover the transaction. The computer arrangement also approves the transaction if the account does not contain sufficient funds and the customer is enrolled in the overdraft protection program. After approval of the transaction, there is a potential overdraft of the account that would occur if settlement is subsequently effected by the financial institution. Instead of charging the customer a fee for overdrafting their account after approving the transaction and settlement occurs, the customer is given a grace period (e.g., 48 hours) during which to provide funds to cover the amount of the overdraft and thereby avoid being charged the fee for overdrafting their account. At the end of the grace period, the customer is charged the fee for the overdraft if they do not provide sufficient funds to cover the amount of the overdraft.

In various implementations, the grace period represents a time during which the financial institution provides funds to cover the transaction(s). In this manner, the financial institution is effectively extending a short-term loan for which the customer can choose to pay before the grace period expires without incurring a penalty. The financial institution can therefore consult a set of rules that determine whether or not the loan can be extended. The rules can assess, for instance, risk factors involved with the particular transaction. These risk factors can include, without limitation, the potential for fraud, the likelihood of default by the customer, limitations on the value of the overdraft and the cost to the financial institution for the short-term loan. The rules can also evaluate credit (deposit) transactions and future or pending transactions that affect the current or available balance in the account.

According to one embodiment of the present disclosure, a circuit-based network system, including for example, ATMs and general purpose computer arrangements, provides the functionality described herein. This circuit-based system receives and responds to data from an internal or external site (relative to the financial institution), oftentimes spurred by a customer transaction activity. The flexibility of the algorithms and implementations as implemented in computer-accessible databanks on behalf of the customer's financial institution, allows for a wide range of different options to be offered to the customer and implemented on the customer's behalf.

FIG. 1 is a block diagram of a circuit-based network system operable on behalf of a bank for overdraft protection and forgiveness on behalf of customers of the bank who are enrolled in an overdraft program, consistent with an embodiment of the present disclosure. The system 100 includes a network-interface/transaction processing circuit 102 that is configured to receive transaction data, from customer-oriented terminals, indicative of the customers 104 of the bank having actively engaged-in various types of financial transactions. The types of customer-oriented terminals vary depending on the implementation. For example, customer-oriented terminals can include bank terminals 106 and/or non-bank/retailer terminals 108. Examples of bank terminals 106 are ATMs of the bank, teller counters located at various branches of the bank, ATMs of other banks, and any other type of interface at which the customers 104 engage in transactions with a bank. Examples of non-bank/retailer terminals 108 are point of sale terminals at which the customers make purchases using checks, debit cards, credit cards, etc. that are tied to accounts held by the customers 104 at the bank. The customer-oriented terminals connect to the system 100 through networks, which, for the non-bank/retailer terminals 108, could be part of a payment network or an interface specifically designed to connect directly to system 100, and which, for the bank terminals 106, could be part of an ATM network.

In one implementation, the transaction processing circuit 102 accesses the customer's account information in customer accounts database 110 and authenticates/approves the financial transaction if the customer's account contains sufficient funds to cover the engaged-in transaction. The transaction processing circuit sends a debit instruction to customer accounts database 110 to instruct the customer's account to be debited by the amount of the approved transaction. The customer accounts database 110 contains information regarding the accounts held by the customers 104 at the bank (e.g., checking and savings accounts).

In the event that the customer's account does not contain sufficient funds to cover the engaged-in transaction, the transaction processing circuit 102 accesses overdraft database 112 to determine whether the customer is enrolled in the overdraft program. In a specific embodiment, the transaction processing circuit 102 extracts a customer ID that identifies the customer who is engaged-in the financial transaction from the received transaction data and provides the extracted customer ID to the overdraft database 112, which contains customer profile data concerning the customers of the bank who are enrolled in the overdraft program. The transaction processing circuit 102 approves the engaged-in transaction if the customer is enrolled in the overdraft program, otherwise the transaction is disapproved. In one implementation, when an actively engaged-in transaction is disapproved, the customer is provided with the option of enrolling in the overdraft program. For example, the customer can be provided with a prompt at an ATM asking whether the customer wants to enroll in the overdraft program. The transaction processing circuit 102 approves the engaged-in transaction if the customer chooses to enroll in the overdraft program.

The transaction processing circuit 102 provides a fee instruction to the overdraft database 112 when approval of the engaged-in transaction results in an overdraft of the customer's account. The fee for the overdraft is not immediately applied to the customer's account; instead the customer is given a grace period (e.g., 48 hours) during which the customer can transfer funds to their account to cover the overdraft and thereby avoid being charged the fee for overdrafting their account. The system 100 includes an overdraft processing and notification circuit 114 that monitors the status of customer overdrafts. For example, in response to a customer overdrafting their account, the overdraft processing and notification circuit 114 starts the grace period and sends a debit instruction to the customer accounts database 110 at the expiration of the grace period if the customer has not deposited sufficient funds in the account to cover the overdraft.

In one implementation, the system 100 provides notification to a customer when a transaction results in an overdraft of their account. For example, overdraft processing and notification circuit 114 can send notification to the customer over a network 116. The network 116 can be any of a variety of public/private types including, e.g., mobile-telephone networks, the Internet or an arrangement of such communication interfaces that permit for conventional, custom and/or customer-specific online banking. In a specific implementation, notification is provided to the customer via text message, email and/or an alert posted by the bank on the customer's online account access.

The customers of the bank can enroll in the overdraft protection program in any one of a number of manners. For example, the customers can enroll using bank terminal 106 and the customers can enroll online via network 116. Enrollment data for the customers is provided to overdraft enrollment circuit 118, which provides instructions to overdraft database 112. In one implementation, the overdraft enrollment circuit 118 generates a customer ID for each of the customers who enroll in the overdraft program. The customer ID could be, for example, the account number of the customer enrolled in the overdraft program.

In another implementation, the customers are provided with various options upon enrolling in the overdraft program. For example, the customer can choose how they want to receive notification of overdrafts (e.g., by email, text message, recorded telephone call or a notification on website). In a specific implementation, the customer can also select options regarding which overdrafts the bank should approve. For example, the customer can specify that only certain types of transactions that result in an overdraft should be approved (e.g., checks that result in an overdraft are approved, but debit card purchases that would result in an overdraft are denied). The customer could also specify that only overdrafts under a certain dollar amount (e.g., $20) are to be approved. In a further implementation, the customer can link another account (e.g., a savings account) to the account that is enrolled in the overdraft program. The customer can instruct the bank to automatically debit funds from the linked account at the expiration of the grace period if the customer does not provide sufficient funds to cover the overdraft. The overdraft database 112 contains customer profile data concerning the various options that are selected by customers of the bank enrolled in the overdraft program.

Embodiments of the present disclosure are also directed toward a computer readable medium programmed with instructions that when executed by a processor perform the various steps or algorithms disclosed herein. These algorithms include those disclosed in the figures and related discussion as well as variations thereof.

For instance, embodiments are directed toward a system that includes at least one computer processor configured with software. The software can be stored on tangible computer readable medium. When the software is executed by the computer processor, the computer processor becomes specially configured. In one embodiment, the system is configured to receive transaction data from customer-oriented terminals, such as terminals 106 or 108. The transaction data can include requests for monetary transfers on behalf of customers 104. The customers 104 can hold a checking or savings account(s) at a financial institution. The monetary transfers can be requests to take funds from the accounts. In response to receiving the transaction data, the system accesses customer account information 110, which can include the amount of funds in the checking or savings account(s). The system then determines whether sufficient funds exist in the accounts to cover the financial transactions. In response to a potential overdraft of one or more customer accounts, the system accesses stored customer information and determines eligibility of the customer for deferment of overdraft fees. The determination can be based upon the stored customer information. The system then authorizes the transaction based upon the determination of eligibility. In response to an overdraft occurring due to subsequent settlement, the system defers a fee for the overdraft. A grace period is then provided during which funds can be transferred to cover the overdraft without charging a penalty and without charging interest.

Figure 2:
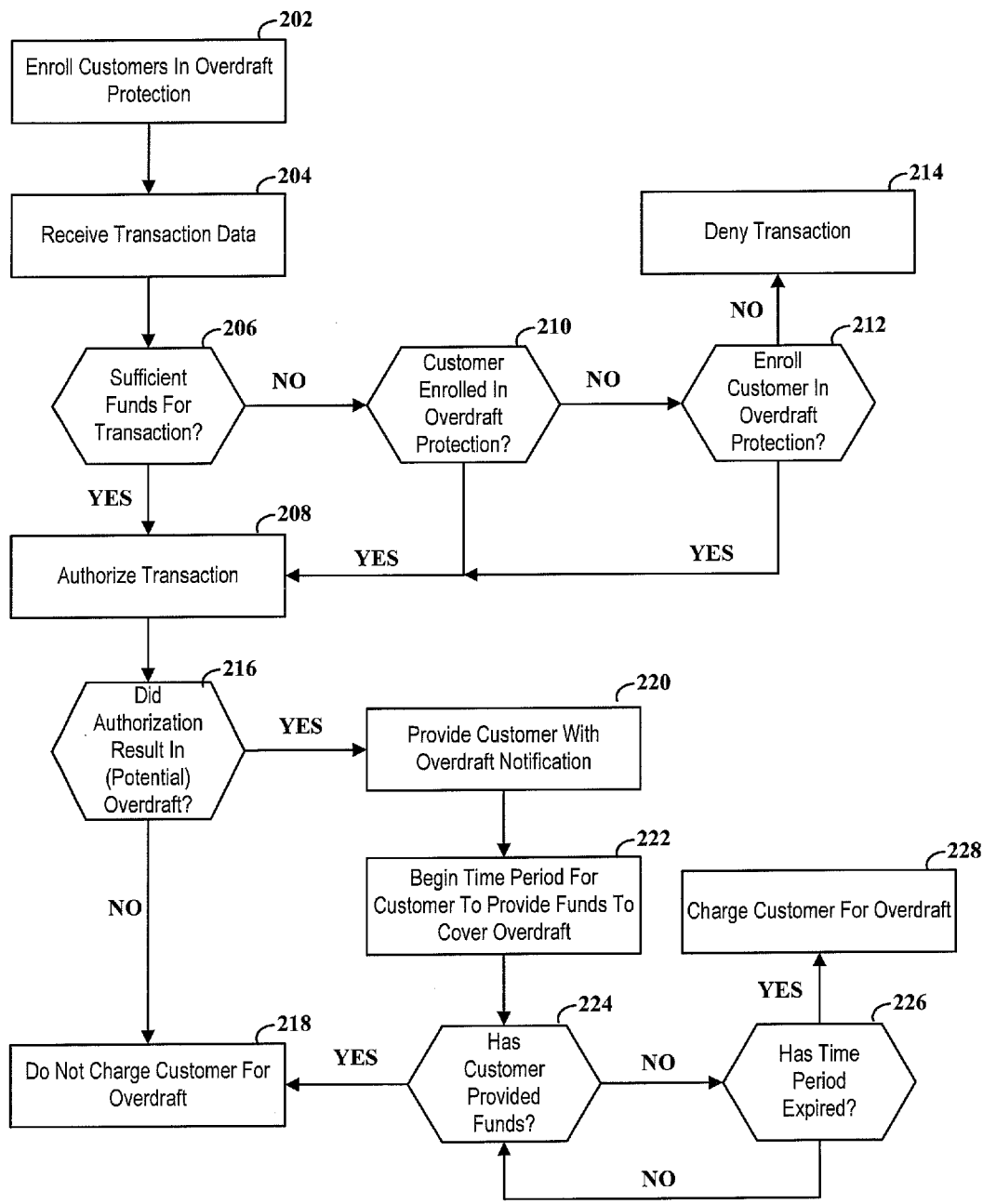
FIG. 2 shows a flow diagram of operation of an overdraft program, consistent with another embodiment of the present disclosure.

FIG. 2 is a flow diagram of operation of an overdraft program for customers of a bank, consistent with another embodiment of the present disclosure. Customers are enrolled in the bank's overdraft protection program in step 202. Enrollment can be accomplished in any number of manners and can include the customers providing various information, as consistent with the various embodiments discussed herein. Enrollment can include enrolling the customer in the overdraft program, whereby each account held by the customer at the bank is subject to overdraft protection. Enrollment can also include enrolling specific customer accounts in the overdraft program (e.g., only the customer's checking account is subject to overdraft protection).

Transaction data representing a customer of the bank being actively engaged-in a financial transaction is received at step 204. A determination is made at step 206 whether the customer's account contains sufficient funds to cover the transaction. The transaction is authorized/approved if the customer's account contains sufficient funds to cover the transaction at step 208. A determination is made at step 210 whether the customer is enrolled in the overdraft program if the customer's account does not contain sufficient funds to cover the transaction. The transaction is authorized at step 208 if the customer is enrolled in the overdraft program. In one implementation, the approval of a transaction that results in (or is likely to result in) an overdraft is contingent on various options selected by the customer enrolled in the overdraft program, as discussed herein. The customer is provided with the option of enrolling in the overdraft program at step 212 if the customer's account does not contain sufficient funds to cover the transaction and the customer is not enrolled in the overdraft program. The transaction is authorized at step 208 if the customer enrolls in the overdraft program. The transaction is denied at step 214 if the customer's account does not contain sufficient funds to cover the transaction, the customer is not enrolled in the overdraft program and the customer chooses not to enroll in the overdraft program.

As an example implementation, a customer may make a purchase using a debit card linked to an account held at their bank. This purchase may exceed the value of funds currently in the account. The bank system can determine that the customer is eligible for deferment of overdraft fees and for enrollment in the overdraft program. The bank system can then send a communication (e.g., text, email, website, telephone call or direct mailing) to the customer. This communication can include both an indication of the overdraft and option to enroll in the overdraft program. The customer can then see, firsthand, the fees that can be saved through enrollment. This provides a real world and personalized example of the benefits provided by the offered overdraft program to the customer.

A determination is made whether authorization of the transaction resulted in an overdraft of the customer's account at step 216. The customer is not charged a fee at step 218 if authorization of the transaction did not result in an overdraft of the customer's account. Notification is provided to the customer at step 220 if authorization of the transaction resulted (or will soon result in) in an overdraft of the customer's account. Notification can be provided in any of a variety of manners including, for example, by telephone, text message and/or email, as discussed herein. A time period is stated at step 222 during which the customer has the opportunity to deposit funds in their account to cover the amount of the overdraft that resulted from authorization of the transaction. For example, the customer is given a grace period during which the customer can avoid being charged a fee for the overdraft by providing funds to cover the overdraft. A determination is made at step 224 whether the customer has provided funds to cover the overdraft and a determination is made at step 226 whether the time period has expired. The customer is not charged a fee for the overdraft at step 218 if the customer provides funds to cover the overdraft before expiration of the time period. The customer is charged a fee for the overdraft at step 228 if the customer does not provide funds to cover the overdraft before expiration of the time period. In one implementation, the fee for the overdraft is debited from one of the customer's accounts.

Various embodiments are directed toward a system that is configured to provide varying fees for overdrafts. The varying fees can be charged as a function of the amount of the transaction(s) and/or the negative balance amount. For example, fees can be assessed according to the transaction amount by charging a reduced fee for transactions under a certain threshold amount and a regular fee for all other transactions. Alternatively, fees can be assessed as a percentage of the transaction amount. Other instances allow for fees to be assessed as a function of the negative balance of the account.

The circuit-implemented system can include one or more of: discrete logic circuitry, programmable logic arrays, specialized processors or general purpose processors specifically programmed. Combinations of these and other circuit elements are also possible and within the scope of various embodiments of the present disclosure. For example, systems consistent with the aspects shown in FIG. 1 could be implemented in a variety of circuit-based forms, such as through the use of data processing circuit modules. More specifically, such systems are exemplified by implementation in high-speed programmable computer/processor circuits that execute stored instructions to provide operations corresponding to the various blocks of FIG. 1. Alternatively, such a computer/processor could be implemented in combination with discrete and or semi-programmable circuitry (e.g., as Field-Programmable Gate Arrays, Programmable Logic Devices/Arrays). Also various ones of the illustrated blocks, and those functions discussed in text, can be implemented using integrated and nonintegrated approaches, e.g., with certain ones of the blocks located remotely and/or operated disparately relative to the other blocks.

Other embodiments are directed to providing the advantageous situation in which overdraft protection is provided for parent/employer (sponsor) of the card/account holder, but with a payment penalty from the account of the child (dependent)/employee card/account holder to the bank for such an overdraft. The business rules would link two accounts for such overdrafts: the sponsor's savings account as the main account for covering, and the child/employee's account for effecting payment to the bank for the penalty fee. In this way, the bank makes money, the parent/employer is provided overdraft protection, and the child/employee is held accountable automatically with a reporting system from the bank to the parent/employer for overdraft and other "threshold-related" violations.

Consistent with one or more embodiments of the present disclosure, a system provides oversight and control functions for individuals that allow other individuals access to their accounts. For instance, a company can allow employees to have access to one or more company accounts or a parent may allow a child to access one or more of their accounts. The system provides an option for each individual to enroll into the overdraft protection program. The individual can have separate accounts and determine for themselves whether or not to participate in the overdraft protection program. In certain implementations, the individuals assume personal responsibility for any resulting overdraft fees. This can be particularly useful for alleviating the need for extensive auditing of spending by the individuals. For instance, companies can provide monthly allotments of money to accounts linked to their employees. If an employee that is enrolled in the overdraft protection program incurs an overdraft fee, the employee has agreed to assume responsibility for the fee. Thus, the employee expenditure can be limited according to the company's allotment and without risking fees being assessed against the company.

Consistent with certain embodiments, the fees are tracked and assessed against the responsible individual. This can include, for instance, assessing the fee against an account, such as a savings account, checking account or credit card account that is held by the individual. Alternatively, the fee can be billed to the responsible individual as part of a periodic (monthly) statement.

Aspects of the present disclosure are directed toward a system designed to offer an option for enrolling during Internet-based transactions. Consistent with one embodiment, a system is configured to operate in connection with an Internet-based verification/authentication system. An Internet merchant can provide an option for payment by a debit account to their customers. For example, the Internet merchant may have a website that the customer can visit. The website can offer goods or services for purchase by the customer. The customers provide debit card information to pay for their respective purchases. The system receives transaction data for the purchase and performs authentication and verification of the transaction. If the system determines that a transaction is for a value that exceeds the available funds corresponding to the debit card information it can respond according to a defined rule set.

Figure 3:
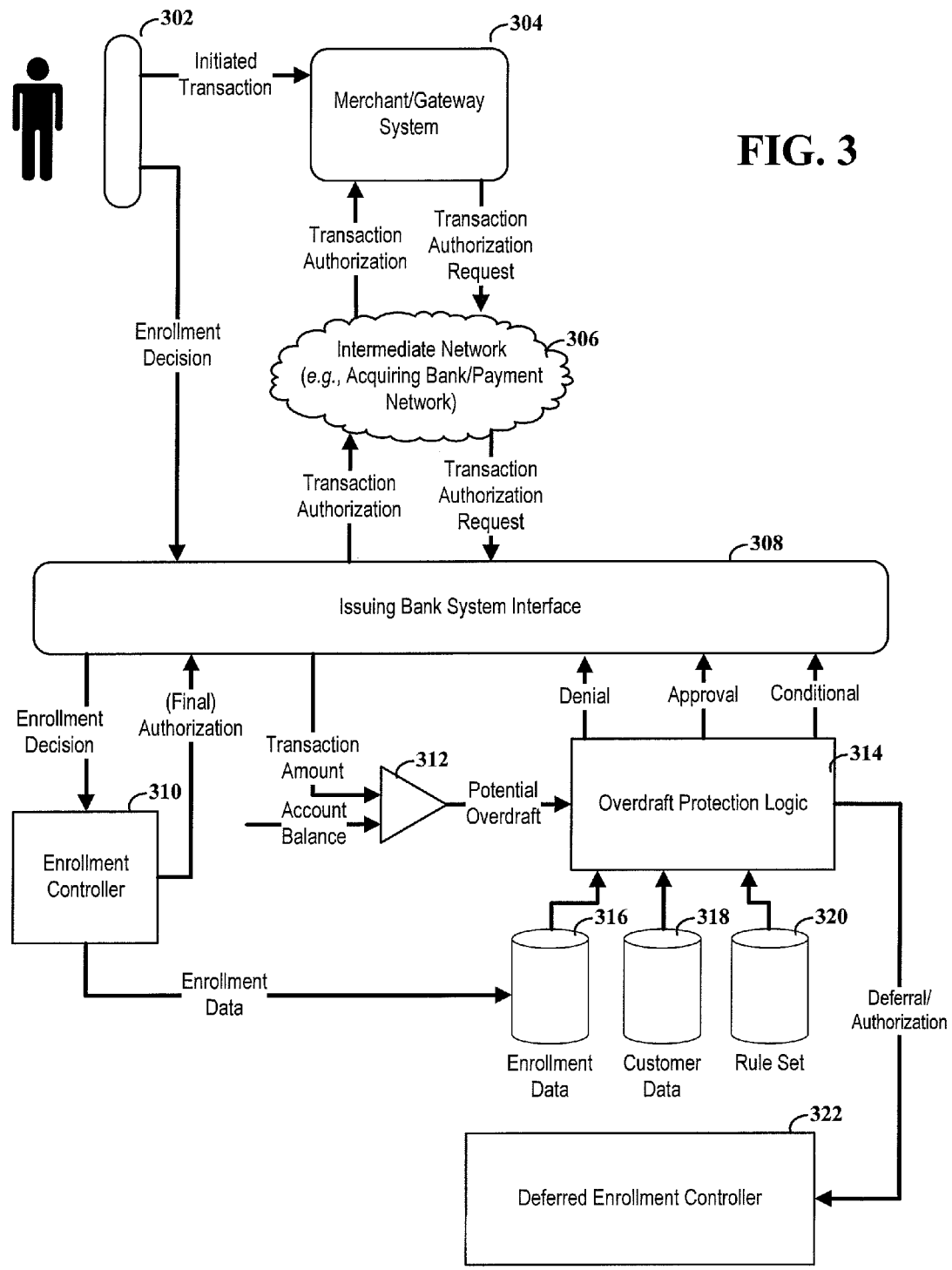
FIG. 3 depicts a flow diagram of a system in which a customer can enroll in an overdraft program, consistent with embodiments of the present disclosure.

FIG. 3 depicts a flow diagram of a system in which a customer can enroll in an overdraft program, consistent with embodiments of the present disclosure. A customer can initiate a financial transaction, such as purchasing goods or services using customer interface 302. As part of the transaction initiation, merchant/gateway system 304 receives transaction data from customer interface 302. System 304 generates a transaction authorization request that is transmitted over an intermediate network 306. The intermediate network 306 is connected to a system interface 308 that is configured to process the authorization request. In the case of a debit card transaction, the system interface 308 can be located and operated by the issuing bank for a debit card of the customer.

The debit card transaction is linked to a customer bank account and the system uses the transaction amount and an account balance to determine whether or not there is a potential overdraft 312. Overdraft protection logic 314 uses this determination to provide approval for the transaction, e.g., in the case that there is no overdraft. System interface 308 responds to this approval by generating a transaction authorization message that can be sent back to the merchant/gateway system 304. The transaction can then be completed.

In the situation where a potential overdraft is detected, however, the overdraft protection logic 314 can use a verification algorithm to determine the appropriate response. The overdraft protection logic 314 can use various inputs to make the determination. For instance, the overdraft protection logic 314 can access an enrollment database 316. If the information in the enrollment database 316 indicates that the customer is already enrolled in an overdraft protection program, then the overdraft protection logic 314 will determine if the potential overdraft should be approved. This determination can be based upon data stored in a rule set database 320, which can indicate (but is not limited to) a maximum overdraft amount, a maximum number of overdrafts and/or indications of possible fraudulent activity. A customer database 318 can also be accessed by the overdraft protection logic 314. This customer database 318 can include information that might include (but is not limited to) a particular overdraft program for the customer, overdraft limits that are specific to the customer, customer set limits and/or customer preferences.

In a particular embodiment of the present disclosure, the system is configured to determine whether or not a transaction amount exceeds the available funds as well as whether or not the customer is currently enrolled in an overdraft protection program. If the customer is not enrolled, the system can provide an enrollment option to the customer. The overdraft protection logic 314 can be configured to provide this enrollment option in the form of a conditional authorization. The conditional authorization can then be provided to merchant/gateway system 304 and to the customer. The authorization is conditional in that the transaction is not denied or accepted until the customer accepts or denies the optional enrollment. The enrollment controller 310 receives the customer decision information and stores it in an enrollment database 316. In response to accepting the option, the system confirms the transaction (e.g., removes the conditional nature) to allow the merchant to complete the transaction. Thereafter, the system records the acceptance by the customer and initiates a formal enrollment process, which can be carried out by deferred enrollment controller 322.

For instance, formal enrollment controller 322 can provide the customer with information regarding the details of the overdraft protection program as well as complying with any legal formalities. The customer can then formally enroll or choose not to enroll.

Figure 4:
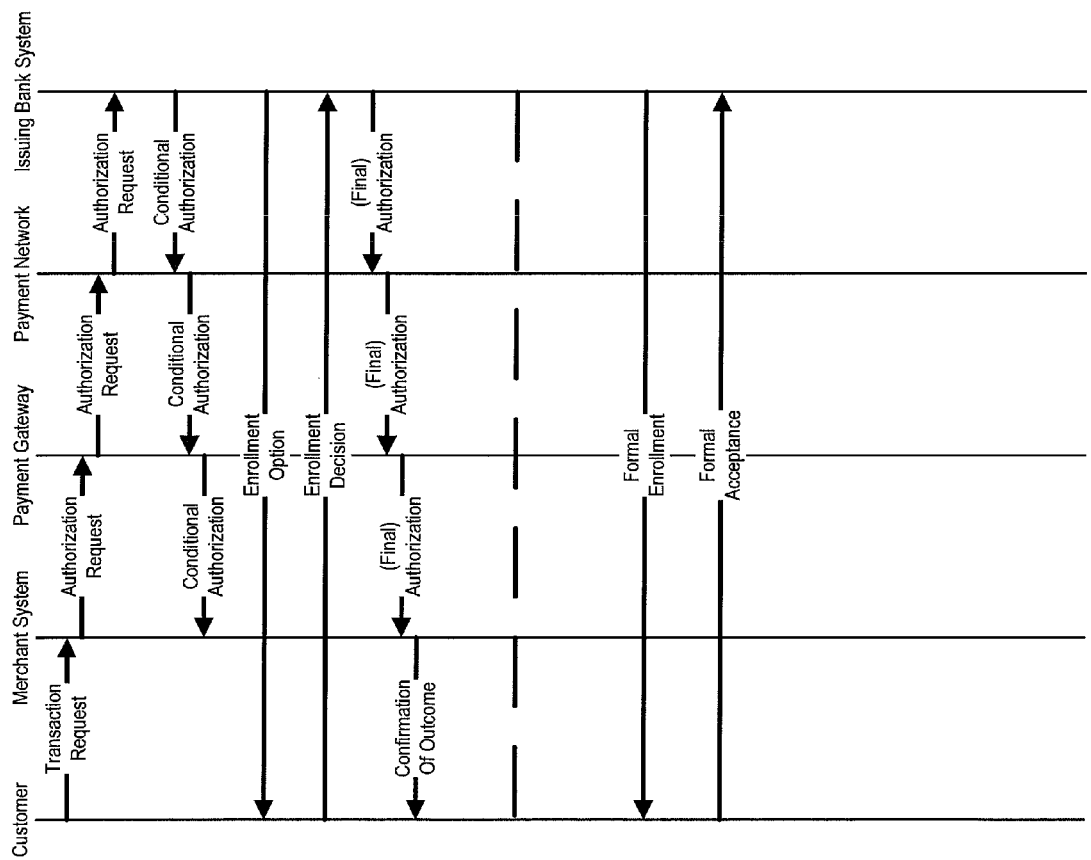
FIG. 4 depicts a communication flow diagram, consistent with embodiments of the present disclosure.

FIG. 4 depicts a communication flow diagram, consistent with embodiments of the present disclosure. A customer can initiate a transaction request to a merchant system. For instance, the protocol can be designed to work with transactions that use debit cards or check cards. The customer can initiate a transaction to pay for a good or service by providing debit card or check card identification to the merchant system. This type of transaction processing can require that the customer also enter a personal-identification number (PIN). The merchant system can generate an authorization request that can be sent to a payment gateway. The payment gateway can forward the authorization requests to an issuing bank using an appropriate payment network.

The issuing bank system can verify the transaction amount, which can be contained in the authorization request, against an account balance associated with the card identification. The authorization can then be approved or denied using an authorization message; however, the flow of FIG. 4 shows another type of authorization response. The protocol includes an authorization response other than "yes" or "no." This additional response is a conditional authorization response that indicates that approval of the transaction is conditional upon the customer accepting the conditions of the authorization. The protocol allows the customer to accept the conditions (e.g., enroll in the overdraft protection program) and thereby confirm authorization of the transaction. The protocol also allows the customer to deny the conditions and thereby deny authorization of the transaction. The conditional response allows the various system components to delay completion of the transaction, whether completion includes authorization or not. This can be particularly useful for allowing the transaction to be completed without requiring a second submission of the transaction data, which can result in additional (transaction) fees being charged to the merchant for use of the payment network.

The protocol can also include subsequent communications to formally enroll a customer in the overdraft protection program. This subsequent communication can be provided independently from the merchant system, such as through email or direct mail communications.

Consistent with other embodiments, the system is configured to send a transaction (denial or acceptance) message through the card network, while separately indicating to the merchant and/or acquiring bank that the transaction is conditionally accepted. In one instance, the separate indication can be provided within the authorization response using, for example, a reserved error code and/or by placing a notification in description field of the authorization response. In other instances, the separate indication can also be accomplished by directly contacting the acquiring bank or the gateway and thereby providing the conditional indication.

The following illustrates an example embodiment of the present disclosure and is not meant to be limiting. A customer visits a merchant website and selects products or services for purchase. The payment information is requested from the customer to complete the desired purchase. The customer provides payment information in the form of a debit card or check card number. The payment information is received by a payment gateway, which sends a request for authorization for the transaction to a computer system of an acquiring bank. The acquiring bank system transmits the authorization request through a payment network, (e.g., as offered by VISA™ or MasterCard™). The payment network transmits the authorization request to computer system of an issuing institution. The issuing institution system checks an amount of the transaction against available funds in an account associated with the debit card or check card number. Assuming that there are sufficient funds and that other security protocols have been met, the issuing institution system transmits an authorization of the transaction to the payment network, which is then routed back to the customer and merchant through the acquiring bank system. If, however, there are insufficient funds to cover the transaction amount, the issuing institution system makes a determination as to whether or not the customer is eligible for an overdraft protection option. Based upon this determination, the issuing institution system can either deny authorization outright or conditionally accept the authorization. When conditionally accepting, the issuing institution system transmits a conditional acceptance to the merchant according to a defined protocol, such as the protocols discussed in detail herein. The issuing institution system also provides the customer with an indication that there are insufficient funds for the transaction and that it will be denied. At about the same time, the issuing institution system can present the customer with an option to (retroactively) enroll in an overdraft protection. If the customer accepts that enrollment option, then the issuing institution system can fully authorize the transaction.

Consistent with some embodiments of the present disclosure, the issuing institution system can use a process similar to an authorization hold to temporarily accept the transaction. Authorization holds are sometimes used to preauthorize a transaction by holding a balance as unavailable until the merchant clears the transaction, or a time period expires. The issuing institution system can then remove the authorization hold if the customer does not accept the enrollment option and notify the merchant of the final status (denied authorization). If, however, the customer does accept the enrollment option, the issuing institution system can notify the merchant of the final status (accepted authorization). As the merchant has been notified of the conditional nature of the acceptance, the merchant can wait for the final authorization.

The concept of an authorization hold or similar temporary acceptance can be particularly useful for avoiding costly fees, embarrassing consequences and other problems associated with a denied transaction. For instance, a customer may provide a debit card to pay for a restaurant bill. The restaurant can use an authorization to confirm the customer has sufficient funds, while allow the customer to add on a tip thereafter. If the customer has insufficient funds, the system can be configured to conditionally accept the transaction while providing an option to the customer to enroll in an overdraft protection program. This avoids having the transaction being denied outright, which may be embarrassing (or worse) as the customer would otherwise need to provide another payment option after having been told that they do have sufficient funds to pay for the bill. The system can be configured to provide the enrollment option using a variety of different communications to the customer, some of which are discussed in more detail herein. For instance, the customer could be contacted on their mobile/cellular device and presented with the enrollment option. In another instance, the system can provide the enrollment information to the merchant, who can then present the customer with the option. For instance, the enrollment option could be provided with a conditional receipt that is only valid if the enrollment is accepted.

Aspects of the present disclosure relate to a system and associated rule sets for assessing whether to provide courtesy/promotional overdraft protection (temporarily or otherwise) for a transaction initiated by a customer that is not currently enrolled in an overdraft protection program. The system can be configured to provide this option without charging overdraft fees (e.g., as a promotional offer), while also providing the customer with an enrollment option. To determine eligibility for the overdraft protection, the system is designed to allow an institution to select and control the factors that determine eligibility. For example, the system can be configured to prevent the enrollment option from being provided multiple times to the same individual. Thus, when a customer is notified of the courtesy overdraft protection, they can also be notified that they will no longer receive such protection in the future (unless they choose to enroll in the overdraft protection program).

According to another example configuration, the system can be configured to make the eligibility determination based upon the type of transaction. For instance, a system operator may desire to limit the courtesy offerings to transactions that are more likely to be viewed as valuable to the customer. The system operator may determine that reoccurring transactions (ACH or otherwise) and physical checks are more likely to be used for important/valuable transactions, such as rent, utility bills, car payments and the like. Thus, the courtesy overdraft protection can be offered for reoccurring transactions and physical checks but not for point-of-sale (POS) transactions. In another instance, the system operator may desire to limit the courtesy offerings as a function of the transaction amount and/or the amount of the potential overdraft. Combinations of these and other factors are also possible.

Consistent with various embodiments of the present disclosure, a system is configured to use rule sets to determine whether or not to provide overdraft protection for a transaction initiated by a customer that is currently enrolled in an overdraft protection program. The system can provide an interface, such as a website, that allows the customer to configure the rule set(s) to determine whether transactions are subject to overdraft protection.

Consistent with one embodiment, the account may be accessible by several individuals. For instance, a child may have access to an account of a parent. The customer can enable overdraft protection for some of the individuals and not for others.

Consistent with embodiments of the present disclosure, the system allows the customer to configure the rule set according to a type of transaction. The customer may determine that reoccurring transactions (ACH or otherwise) and physical checks are more likely to be used for important/valuable transactions, such as rent, utility bills, car payments and the like. Thus, the courtesy overdraft protection can be offered for reoccurring transactions and physical checks but not for point-of-sale (POS) transactions.

Consistent with other embodiments of the present disclosure, the system is configured to present the customer with options for overdraft protection for transactions initiated through the issuing bank. For instance, banks may offer a bill payment service that allows individuals to pay their bills online. The banks transfer money in response to the customer scheduling one-time or recurring payments, a source account and a destination. Generally speaking, a customer might find these transactions to be important enough to cover with an overdraft protection. A customer with this mindset can configure the system so that the rule set always provides overdraft protection for these transactions.

Other rules can be set based upon various other factors including, but not limited to, the transaction amount, the amount of the overdraft, a balance in other accounts, and a number of overdrafts within a certain time period.

Aspects of the present disclosure relate to a system configured to provide a payment selection option to a customer after the transaction has been authorized. This payment selection option allows the customer to choose between their available accounts to pay for the transaction and can be provided in connection with a courtesy/promotional overdraft protection, or with a previously-enrolled customer.

For instance, the system can detect a potential overdraft and determine that the potential overdraft is not protected by an overdraft policy, but qualifies for a courtesy/promotional overdraft protection. The system can provide the courtesy overdraft protection. As part of the courtesy overdraft protection, the system defers debiting any account until after the customer has been contacted and presented with options for how to pay for the potential overdraft. In response to a selection, the system debits the appropriate account.

As an example, a customer that has been provided with courtesy overdraft protection could be directed toward an Internet website that lists a number of available accounts held by the customer. In certain embodiments, the customer can also specify additional accounts by providing sufficient details (e.g., account numbers, routing information and the like). The customer can then select which account the transaction should be credited against. Alternatively or in addition, the deferral can provide the customer with an opportunity to provide funds to the original account associated with the potential overdraft.

Figure 5:
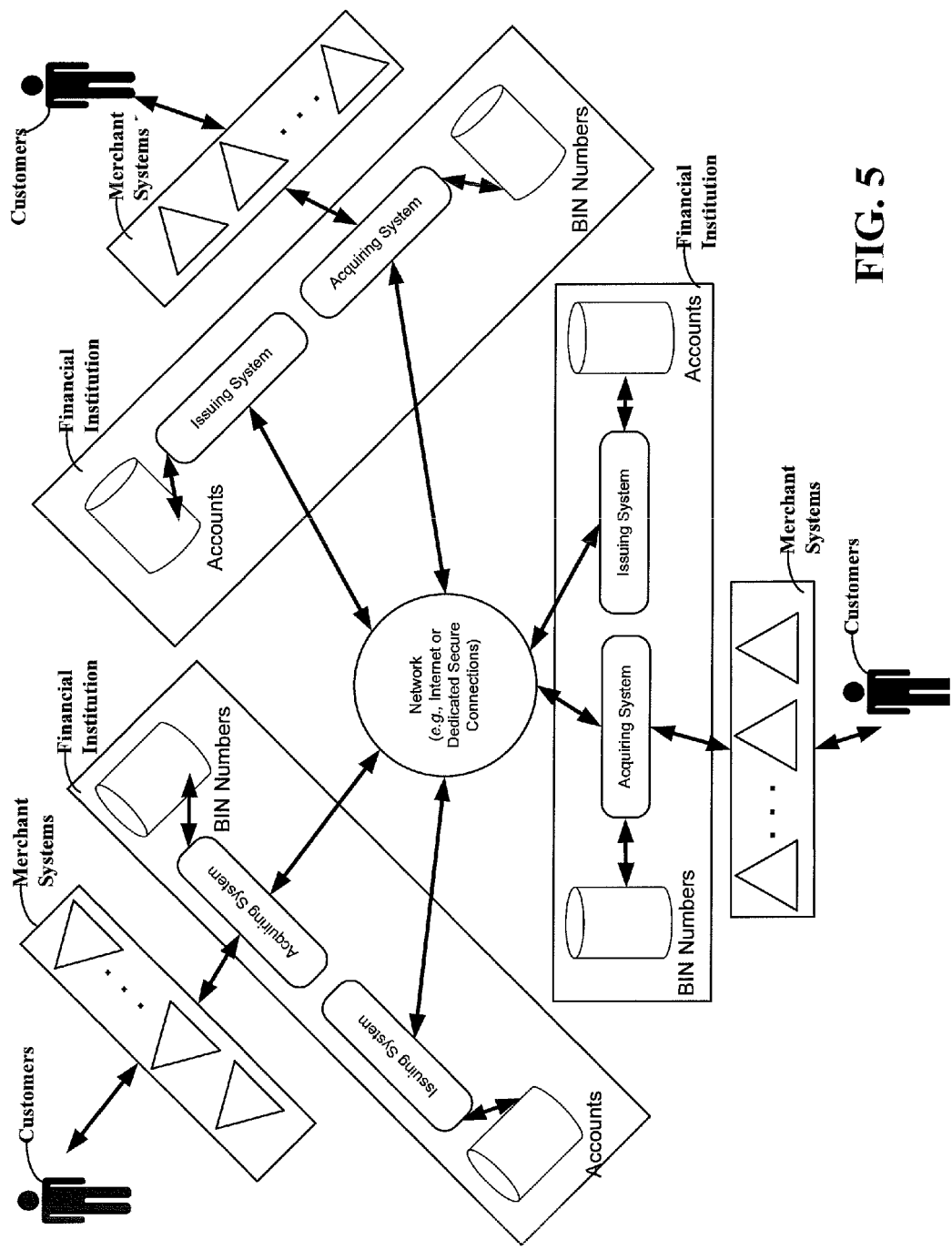
FIG. 5 depicts a block diagram of a transaction interchange system, consistent with embodiments of the present disclosure.

FIG. 5 depicts a block diagram of a transaction interchange system, consistent with embodiments of the present disclosure. Embodiments of the present disclosure are directed towards a system that facilitates overdraft protection enrollment. The system is configured to allow transactions to be processed and conditional confirmations to be provided in a manner than can be useful for reducing or eliminating interchange fees. For instance, as some of the protocols that use the conditional confirmation can require multiple communications, a payment network (e.g., VISA™ or MasterCard™) may charge multiple interchange fees for what is essentially the same transaction. Accordingly, various embodiments are directed towards a system that is configured to provide communications between financial institutions in a manner that does not use such payment networks.

As shown in FIG. 5, there can be a large number of different merchants using a large number of different acquiring financial institutions. Similarly, there can be a large number of different consumers that have accounts held at a large number of issuing financial institutions. The financial institutions are depicted as operating as both an acquiring and issuing institution; however, the financial institutions can also be only an acquirer or only an issuer. Merchants' systems are configured to route transaction authorization requests to a particular acquiring system, which the merchant can have an agreement therewith.

The acquiring system checks the transaction data in the authorization requests to determine eligibility of the issuing bank to use an alternative routing solution, which can be used for an enrollment program. This determination can be accomplished using information submitted by the merchant. For example, debit cards and check cards often include a Bank Identification Number (BIN) that indicates the issuing bank. This BIN number can be, for example, the first six digits of the credit card number. The acquiring bank can determine eligibility of the transaction by comparing the BIN number against a database containing BIN numbers of participating banks. In certain embodiments, an additional check can be made on specific card numbers or consumers. For instance, a database can include consumers and/or card numbers that are not eligible for enrollment (e.g., consumers that are already enrolled or that have turned down an enrollment option in the past).

Transaction data for eligible transactions can be routed to the corresponding issuing bank using transmission routes outside of the credit card payment network or similar payment network that might otherwise be used in connection with the transaction. For instance, the transaction data can be transmitted over the Internet (e.g., using SSL or similar security), dedicated secure lines (e.g., using T1 lines reserved for transactions between systems) and/or using other networks linking the different systems. The issuing bank can check the transaction data against an available balance to detect a potential overdraft. In response to a potential overdraft, the issuing bank can provide overdraft protection enrollment options to the consumer. If the consumer accepts the enrollment, the transaction can be submitted to the credit card payment network or similar payment network. The issuing bank can then authorize the transaction because the consumer has agreed to enroll in the overdraft protection program. These aspects can be particularly useful for avoiding (interchange) fees associated with multiple transaction requests through a credit card payment network.

The system's ability to perform transaction verification and/or enrollment functions outside of the credit card (or similar) payment network can be useful for a variety of other purposes. For instance, the system can be used in connection with a disparate payment network system described in U.S. patent application Ser. No. 12/901,347, which is fully incorporated herein by reference. The transaction monitoring can be sent to the disparate payment network system, which selects a desired payment network for the transaction. Rather than process the transaction directly through the desired payment network, however, the issuing bank associated with the selected payment network can be contacted directly as discussed herein.

The signals and associated logic and functionality described in connection with the figures can be implemented in a number of different manners. Unless otherwise indicated, various modules can be implemented using different general purpose systems and/or logic circuitry may be used with programs in accordance with the teachings herein, or it may prove convenient to construct a more specialized apparatus to perform the required method. For example, according to the present disclosure, one or more of the methods can be implemented using modules that can include hard-wired circuitry by programming a general-purpose processor, other fully or semi-programmable logic circuitry, and/or by a combination of such hardware and a general-purpose processor configured with software.

It is recognized that aspects of the disclosure, including methods, systems or devices, can be practiced with computer/processor-based system configurations other than those expressly described herein. The required structure for a variety of these systems and circuits would be apparent from the intended application and the above description.

The various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, it is recognized that a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions. Such a medium would, of course, not be only an electrical signal because an electrical signal cannot exist without a physical medium.

The various embodiments described above are provided by way of illustration only and should not be construed to limit the disclosure. Based upon the above discussion and illustrations, those skilled in the art will readily recognize that various modifications and changes may be made to the present disclosure without strictly following the exemplary embodiments and applications illustrated and described herein. Such modifications and changes do not depart from the true spirit and scope of the present disclosure, including that set forth in the following claims.

What is claimed is:

1. A system comprising:
    a database circuit configured and arranged to store customer account information including an amount of funds in at least one of a checking or savings account for the customer;
    at least one computer circuit connected to the database circuit and configured and arranged to access data therein, the at least one computer circuit having a plurality of modules including:
        a first circuit module configured and arranged to receive transaction data from customer-oriented terminals, the transaction data including requests for monetary transfers on behalf of customers having, and the monetary transfers from, checking or savings accounts held at a financial institution;
        a second circuit module configured and arranged to access, in response to receiving the transaction data, the customer account information in the database circuit that includes the amount of funds in the checking or savings accounts;
        a third circuit module configured and arranged to determine whether sufficient funds exist in the checking or savings account to cover financial transactions; and
        a fourth circuit module configured and arranged to, in response to a potential overdraft of one or more customer accounts,
            access the stored customer account information in the database circuit;
            determine, based upon the stored customer account information, eligibility of the customer for enrollment in an overdraft protection program;
            authorize the transaction based upon the determination of eligibility;
            provide an indication of eligibility to the customer; and
            provide a grace period during which funds can be transferred to cover the overdraft without charging a penalty for the overdraft; and
            provide, to the customer-oriented terminals, an indication of fees saved for the overdraft by enrollment in the overdraft protection program.

2. The system of claim 1, wherein authorizing the transaction includes sending a conditional authorization to the customer-oriented terminals and, in response to receiving an overdraft protection enrollment confirmation from the customer-oriented terminals, providing an authorization notification for the transaction.

3. The system of claim 1, wherein the fourth circuit module is further configured to charge the penalty for the overdraft in response to an expiration of the grace period.

4. The system of claim 1, wherein the fourth circuit module is further configured to charge a penalty for the overdraft in response to an expiration of the grace period and wherein the penalty includes at least one of a fee and interest based upon the overdraft amount.

5. The system of claim 1, wherein the fourth circuit module is further configured to provide formal enrollment information to the customer after authorizing the transaction.

6. The system of claim 1, wherein the fourth circuit module is further configured to provide the indication of eligibility in response to determining that the customer was not previously offered an enrollment opportunity.

7. The system of claim 1, wherein the fourth circuit module is further configured to determine eligibility of the customer in response to a type of transaction indicated by the transaction data.

8. A method of operating a computer circuit that includes one or more computer circuit modules, the method performed by the computer modules and comprising:
    receiving transaction data from customer-oriented terminals, the transaction data including requests for monetary transfers on behalf of customers having, and the monetary transfers from, checking or savings accounts held at a financial institution;
    in response to the transaction data, using the computer circuit to access a database circuit containing customer account information that includes an amount of funds in the checking or savings accounts;
    determining whether sufficient funds exist in the accounts to cover funds for the monetary transfers;
    in response to a potential overdraft of the one or more checking or savings accounts
        accessing stored customer account information,
        determining, based upon the stored customer account information, eligibility of the customer for enrollment in an overdraft protection program,
        authorizing the transaction based upon the determination of eligibility,
        providing an indication of eligibility to the customer, providing a grace period during which funds can be transferred to cover the overdraft without charging a penalty for the overdraft; and providing, to the customer-oriented terminals, an indication of fees saved for the overdraft by enrollment in the overdraft protection program.

9. The method of claim 8, wherein authorizing the transaction includes sending a conditional authorization to the customer-oriented terminals and, in response to receiving approval of the conditional authorization from the customer-oriented terminals, providing an authorization notification for the transaction.

10. The method of claim 8, further including charging the penalty for the overdraft in response to the expiration of the grace period.

11. The method of claim 8, further including charging the penalty for the overdraft in response to the expiration of the grace period and wherein the penalty includes at least one of a fee and interest based upon the overdraft amount.

12. The method of claim 8, further including providing formal enrollment information to the customer after authorizing the transaction.

13. The method of claim 8, wherein providing the indication of eligibility is in response to determining that the customer was not previously offered an enrollment opportunity.

14. The method of claim 8, further including determining eligibility of the customer in response to a type of transaction indicated by the transaction data.

15. A non-transitory computer readable medium storing instructions thereupon that, when executed by a computer, causes the computer to perform a method comprising:

receiving transaction data from customer-oriented terminals, the transaction data including requests for monetary transfers on behalf of customers having, and the monetary transfers from, checking or savings accounts held at a financial institution;

accessing, in response to receiving the transaction data, customer account information in a database circuit, the account information including an amount of funds in the checking or savings accounts;

determining whether sufficient funds exist in the checking or savings accounts to cover the monetary transfers; and in response to a potential overdraft of one or more customer accounts accessing stored customer information, determining, based upon the stored customer information, eligibility of the customer for enrollment in an overdraft protection program, authorizing the transaction based upon the determination of eligibility, providing an indication of eligibility to the customer, providing a grace period during which funds can be transferred to cover the overdraft without charging a penalty for the overdraft, and providing, to the customer-oriented terminals, an indication of fees saved for the overdraft by enrollment in the overdraft protection program.

* * * * *